US012548879B2

(12) United States Patent
Rhoads et al.

(10) Patent No.: US 12,548,879 B2
(45) Date of Patent: Feb. 10, 2026

(54) APPARATUS AND METHOD FOR COUPLING ELECTROMAGNETIC ENERGY INTO A CAVITY OF A RESONATOR WHICH INCLUDES ONE OR MORE LOOP-GAP RESONATORS

(71) Applicant: Honeywell International Inc., Charlotte, NC (US)

(72) Inventors: Charles Rhoads, North Hollywood, CA (US); Chad Fertig, Roseville, MN (US)

(73) Assignee: Honeywell International Inc., Charlotte, NC (US)

( * ) Notice: Subject to any disclaimer, the term of this patent is extended or adjusted under 35 U.S.C. 154(b) by 159 days.

(21) Appl. No.: 18/431,068

(22) Filed: Feb. 2, 2024

(65) Prior Publication Data

US 2025/0253516 A1 Aug. 7, 2025

(51) Int. Cl.
*H01P 7/06* (2006.01)
*H01P 1/208* (2006.01)

(52) U.S. Cl.
CPC ................ *H01P 7/06* (2013.01); *H01P 1/208* (2013.01)

(58) Field of Classification Search
CPC . H01P 7/06; H01P 1/208; G01C 19/62; G04F 5/14; G04F 5/145; H03L 7/26
USPC ......................................................... 331/94.1
See application file for complete search history.

(56) References Cited

U.S. PATENT DOCUMENTS 3,387,207 A 6/1968 Vessot
4,446,429 A * 5/1984 Froncisz .................. H01P 7/04 333/219
4,480,239 A * 10/1984 Hyde ...................... H01P 1/208 333/175
5,461,346 A 10/1995 Petit et al.
8,058,935 B2 11/2011 Lynch et al.
9,083,363 B2 7/2015 Fertig et al.
9,306,265 B1 4/2016 Hossein-Zadeh
9,989,926 B2 6/2018 Fertig et al.
10,218,368 B2 2/2019 Fertig et al.
2023/0178868 A1 6/2023 Semnani et al.

FOREIGN PATENT DOCUMENTS

DE 69304383 T2 3/1997
EP 3208668 B1 5/2018
WO 0135485 A1 5/2001

OTHER PUBLICATIONS

He et al., "Performance Optimizations of Optically Pumped Cesium Beam Frequency Standard", 2021 Joint Conference of the European Frequency and Time Forum and IEEE International Frequency Control Symposium (EFTF/IFCS), downloaded Dec. 5, 2023 from IEEE Xplore, pp. 1 through 3.
European Patent Office, "Extended European Search Report", dated May 21, 2025, from EP Application No. 24215480.5, from Foreign Counterpart to U.S. Appl. No. 18/431,068, pp. 1 through 8, Published: EP.

* cited by examiner

*Primary Examiner* — Richard Tan
(74) *Attorney, Agent, or Firm* — Fogg & Powers LLC

(57) ABSTRACT

Techniques are provided for efficiently coupling radio frequency spectrum electromagnetic energy into a central cavity of a resonator also including one or more loop-gap resonator. The electromagnetic energy is first coupled into each loop-gap resonator. A portion of each electromagnetic energy is coupled from each loop-gap resonator into the central cavity.

17 Claims, 5 Drawing Sheets

440

APPARATUS AND METHOD FOR COUPLING ELECTROMAGNETIC ENERGY INTO A CAVITY OF A RESONATOR WHICH INCLUDES ONE OR MORE LOOP-GAP RESONATORS

STATEMENT REGARDING FEDERALLY SPONSORED RESEARCH OR DEVELOPMENT

This invention was made with Government support under Contract No. N00014-22-C-1043 awarded by the Office of Naval Research. The Government has certain rights in the invention.

BACKGROUND

An electromagnetic resonator including a central cavity and two or more peripheral cavities coupled to the central cavity via capacitive gaps, is used in an atomic clock to provide an electromagnetic field, in a radio frequency spectrum, which causes electrons of atoms in the central cavity to change energy states. In the central cavity, the electromagnetic field has a substantially stable phase and amplitude. Modern applications require atomic clocks of diminished size which consume diminished electrical power. Correspondingly, a source of electromagnetic energy, in the radio frequency spectrum and which is configured to provide the electromagnetic field, has a diminished power level.

SUMMARY

In some aspects, the techniques described herein relate to an apparatus for efficiently coupling electromagnetic energy into a central cavity of a primary resonator in an electrically conductive ring, the apparatus including: the central cavity in the electrically conductive ring; one or more satellite cavities in the electrically conductive ring; one or more gaps in the electrically conductive ring, wherein each gap commences at a unique satellite cavity and terminates at the central cavity, and wherein each gap, the central cavity, and each satellite cavity are each a void in the electrically conductive ring; one or more loop-gap resonators, wherein each loop-gap resonator includes the unique satellite cavity and a unique gap between the unique satellite cavity and the central cavity; wherein each loop-gap resonator is configured to receive radio frequency spectrum electromagnetic energy from a source external to the electrically conductive ring; and the primary resonator including each loop-gap resonator and the central cavity; wherein each loop-gap resonator is configured to electromagnetically couple at least a portion of the radio frequency spectrum electromagnetic energy into the central cavity.

In some aspects, the techniques described herein relate to a method for efficiently coupling electromagnetic energy into a central cavity of a primary resonator in an electrically conductive ring, the method including: receiving radio frequency spectrum electromagnetic energy in one or more loop-gap resonators, wherein each loop-gap resonator is configured to receive the radio frequency spectrum electromagnetic energy from a source external to the electrically conductive ring, wherein each loop-gap resonator includes a unique satellite cavity and a unique gap connecting the unique satellite cavity to the central cavity, wherein each gap, each satellite cavity, and the central cavity are in the electrically conductive ring, and wherein each gap, the central cavity, and each satellite cavity are each void in the electrically conductive ring; and electromagnetically coupling from the one or more loop-gap resonators at least a portion of the radio frequency spectrum electromagnetic energy into the central cavity, wherein the primary resonator includes each loop-gap resonator and the central cavity.

In some aspects, the techniques described herein relate to an apparatus configured to efficiently couple electromagnetic energy into a central cavity in an electrically conductive ring, the apparatus including: the electrically conductive ring including an electrical conductor, the central cavity in the electrical conductor defined by an inner radius, a plurality of gaps in the electrical conductor, and a plurality of satellite cavities in the electrical conductor, wherein each satellite cavity is disposed about the central cavity, is equally spaced with respect to each adjacent satellite cavity, and is equally spaced with respect to the central cavity, wherein each satellite cavity is connected by a unique gap, wherein each satellite cavity has a satellite cavity radius, wherein each gap, the central cavity, and each satellite cavity are each a void in the electrical conductor; at least one loop-gap resonator, wherein each loop-gap resonator includes a unique satellite cavity and a gap connecting the unique satellite cavity to the central cavity; a primary resonator including each loop-gap resonator and the central cavity; and a plurality of a set of at least one shielded transmission line and an electromagnetic coupling element, wherein each shielded transmission line of a set is electromagnetically coupled to a coupling element, wherein each coupling element is configured to electromagnetically couple radio frequency spectrum electromagnetic energy to a unique loop-gap resonator, and wherein each loop-gap resonator is configured to electromagnetically couple at least a portion of the radio frequency spectrum electromagnetic energy into the central cavity.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Figure 1:
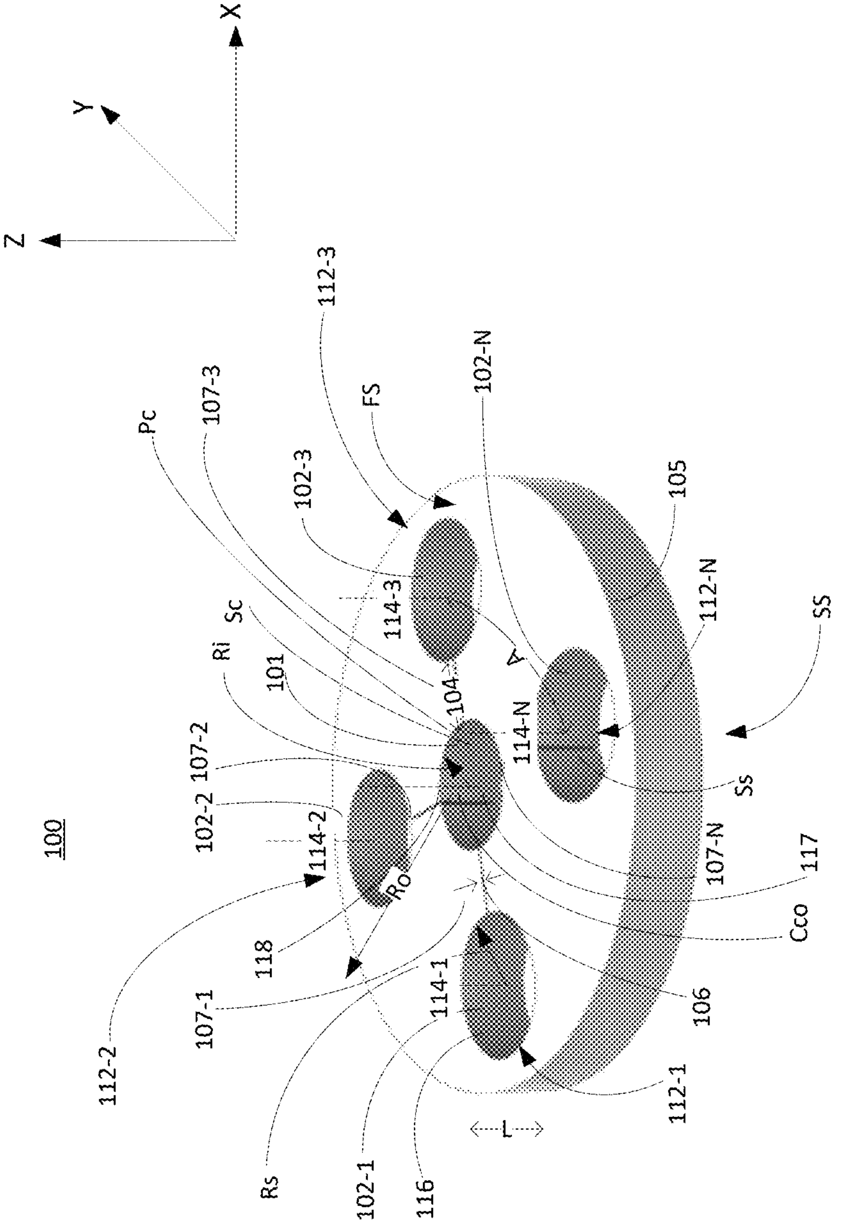
FIG. 1 illustrates a diagram of one embodiment of a resonator including one or more loop-gap resonators.

In the following detailed description, reference is made to the accompanying drawings that form a part hereof, and in which is shown by way of illustration specific illustrative embodiments. However, it is to be understood that other embodiments may be utilized and that structural, mechanical, and/or electrical changes may be made. Furthermore, each method presented in the drawing figures and the specification is not to be construed as limiting the order in which the individual steps may be performed. The following detailed description is not to be taken in a limiting sense.

Embodiments of the invention efficiently couple an electromagnetic energy, i.e., in a radio frequency spectrum (e.g., between 1 kHz and 300 GHz), into a central cavity of a resonator (or primary resonator) which also includes one or more loop-gap resonators. Optionally, the frequency of the electromagnetic energy is 6.8 GHz. Each satellite cavity is dispersed around the central cavity and is connected to the central cavity by a gap, i.e. a capacitive gap. Thus, each gap connects the central cavity and a unique satellite cavity. Each gap, each satellite cavity, and the central cavity are each a void in an electrically conductive ring. Unless expressly recited otherwise elsewhere herein, cavity does not mean a primary resonator.

A satellite cavity and a gap connecting the satellite cavity with the central cavity form a loop-gap resonator, which may also be referred to herein as a satellite resonator. The central cavity and each satellite cavity and each gap connecting the central cavity to a satellite cavity form the primary resonator. Each gap may also be referred to herein as a capacitive gap or a slot.

Electromagnetic energy at a first frequency is coupled from an external source, through each of a set of one or more coupling elements, into each loop-gap resonator having a first resonant frequency. A fraction of the electromagnetic energy is electromagnetically coupled, through near field radiation, into each loop-gap resonator from a unique coupling element. Optionally, each coupling element may be a conductive loop, for example such as a wire coil. Optionally, each loop-gap resonator has a first resonant frequency. At least a portion of the electromagnetic energy is then electromagnetically coupled into the central cavity of the primary resonator from the loop-gap resonators. The primary resonator has a second resonant frequency. The foregoing technique efficiently couples electromagnetic energy from an external source into the central cavity of the primary resonator. As a result, a lower power, and optionally a lower cost and/or more compact, source of electromagnetic energy can be utilized.

Optionally, the primary resonator has a second resonance centered about the second resonant frequency, and each loop-gap resonator has a first resonance centered about first resonance frequency. Optionally, a difference between the first and the second resonant frequencies is less than or equal to either one, two, or three line widths of a broadest resonance of the first resonance and the second resonance. Optionally, the first and the second resonant frequencies are substantially equal. Optionally, the first frequency substantially equals the first and the second resonant frequencies.

Optionally, the primary resonator may be used in an atomic sensor. Optionally, the atomic sensor is an atomic clock. However, the atomic sensor may alternatively be another type of atomic sensor.

Optionally, embodiments of the invention provide a substantially uniform amplitude and phase of the electromagnetic field throughout a central cavity of the primary resonator which contains atoms. Optionally, every atom in the central cavity experiences a field which differs in phase from the field experienced by other atoms by less than 0.1%. As a result, atomic sensor accuracy is enhanced.

FIG. 1 illustrates a diagram of one embodiment of a primary resonator including one or more loop-gap resonators (or primary resonator) 100. The dimensions (e.g., length and radii) of the primary resonator 100 may differ among each embodiment. The relative dimensions shown in FIG. 1 are for pedagogical purposes only. For pedagogical purposes, FIG. 1 illustrates the satellite and central cavities as cylindrical cavities; alternatively, the two or more of the cavities may be non-cylindrical cavities.

The primary resonator 100 includes an electrically conductive ring 105 including a central cavity 101 surrounded by N satellite cavities 102-1, 102-2, 102-3, 102-N. N is an integer greater than zero, e.g. one, two, three, four, or more than four. For pedagogical purposes, the electrically conductive ring 105 is illustrated as having a circular outer perimeter; however, alternatively, the outer perimeter may have a different shape, e.g., a square outer perimeter.

The illustrated electrically conductive ring 105 has an outer radius Ro, an inner radius Ri, and a length L. The outer radius Ro and the inner radius Ri project from a center axis 118 of the primary resonator 100, and thus the electrically conductive ring 105. Thus, the central cavity 101 is centered around the center axis 118. Optionally, the length (or cylinder length) L is in a Z-axis Z, and the center axis 118 is parallel to the Z-axis Z.

The central cavity 101 has a radius equal to the inner radius Ri and a length equal to the length L. A cross section 117 of the central cavity 101 has a perimeter Pc defined by the inner radius Ri.

Each satellite cavity 102-1, 102-2, 102-3, 102-N has a radius Rs, projecting from a center axis of the satellite cavity, and a length equal to length L. A cross-section 116 of a satellite cavity has a perimeter Ps defined by the radius Rs of the satellite cavity. Optionally, the center axis 114-1, 114-2, 114-3, 114-N of each satellite cavity 102-1, 102-2, 102-3, 102-N is equidistant from the center axis 118 of the central cavity 101.

The electrically conductive ring 105 has a first surface FS and a second surface SS. The first surface FS is opposite the second surface SS. The first surface FS is separate by length L from the second surface SS. Thus, the central cavity 101 and each of the satellite cavities 102-1, 102-2, 102-3, 102-N are formed in the electrically conductive ring 105 between the first surface FS and the second surface SS. Optionally, the length L is perpendicular to the first and the second surfaces FS, SS.

Each satellite cavity 102-1, 102-2, 102-3, 102-N is connected to the central cavity 101 by a gap 107-1, 107-2, 107-3, 107-N in the primary resonator 100. Each gap 107-1, 107-2, 107-3, 107-N which propagates from a surface Sc of the central cavity 101 to a surface Ss of the satellite cavity. Optionally, each gap 107-1, 107-2, 107-3, 107-N is a cuboid[1] and propagates between a region of a perimeter Pc of the central cavity 101 closest to a region of a perimeter Ps of a satellite cavity connected to the central cavity by the gap.

[1] In such case, each gap 107-1, 107-2, 107-3, 107-N has a gap width 106 and a gap length 104. The gap width 106 of each gap 107-1, 107-2, 107-3, 107-N is smaller than the central cavity's radius Ri or the radius Rs of each satellite cavity.

An area of the surface Sc of the central cavity 101 is defined by the perimeter Pc of the central cavity 101 and the cylinder length L of the electrically conductive ring 105, e.g., of the central cavity 101. An area of the surface Ss of each satellite cavity 102-1, 102-2, 102-3, 102-N is defined by the perimeter Ps of the satellite cavity and the cylinder length L of the electrically conductive ring 105, e.g., of the satellite cavity.

Optionally, a center axis of each satellite cavity 102-1, 102-2, 102-3, 102-N is separated from a center axis of each adjacent satellite cavity by angle A (with respect to the center axis 118) when the first and the second satellite cavities are adjacent to one another. In such case, the angle A equals three hundred and sixty degrees divided by N. Optionally, each center axis of each satellite cavity 102-1, 102-2, 102-3, 102-N is displaced from the center axis 118 of the central cavity 101 by a same distance. Thus, optionally, each pair of adjacent satellite cavity are equally spaced in the electrical conductive ring; further, optionally, when a gap length 104 is the same for each gap, then each satellite cavity is equally spaced from the central cavity 101. Optionally a gap width 106 is the same for each gap.

Optionally, closest adjacent points on the perimeter Ps of each satellite cavity 102-1, 102-2, 102-3, 102-N and on perimeter Pc of the central cavity 101 are separated by a gap length 104 of the gaps 107-1, 107-2, 107-3, 107-N. Optionally, each gap is separated from each adjacent gap by angle A (with respect to the center axis 118).

The primary resonator 100 includes (i) a central cavity 101 and (ii) N loop-gap resonators 112-1, 112-2, 112-3, 112-N, i.e., each satellite cavity and each gap 107-1, 107-2, 107-3, 107-N connecting the central cavity 101 to a satellite cavity 102-1, 102-2, 102-3, 102-N. Each of the N loop-gap resonators 112-1, 112-2, 112-3, 112-N includes a satellite cavity and a gap connecting the central cavity 101 and the satellite cavity.

Figure 2:
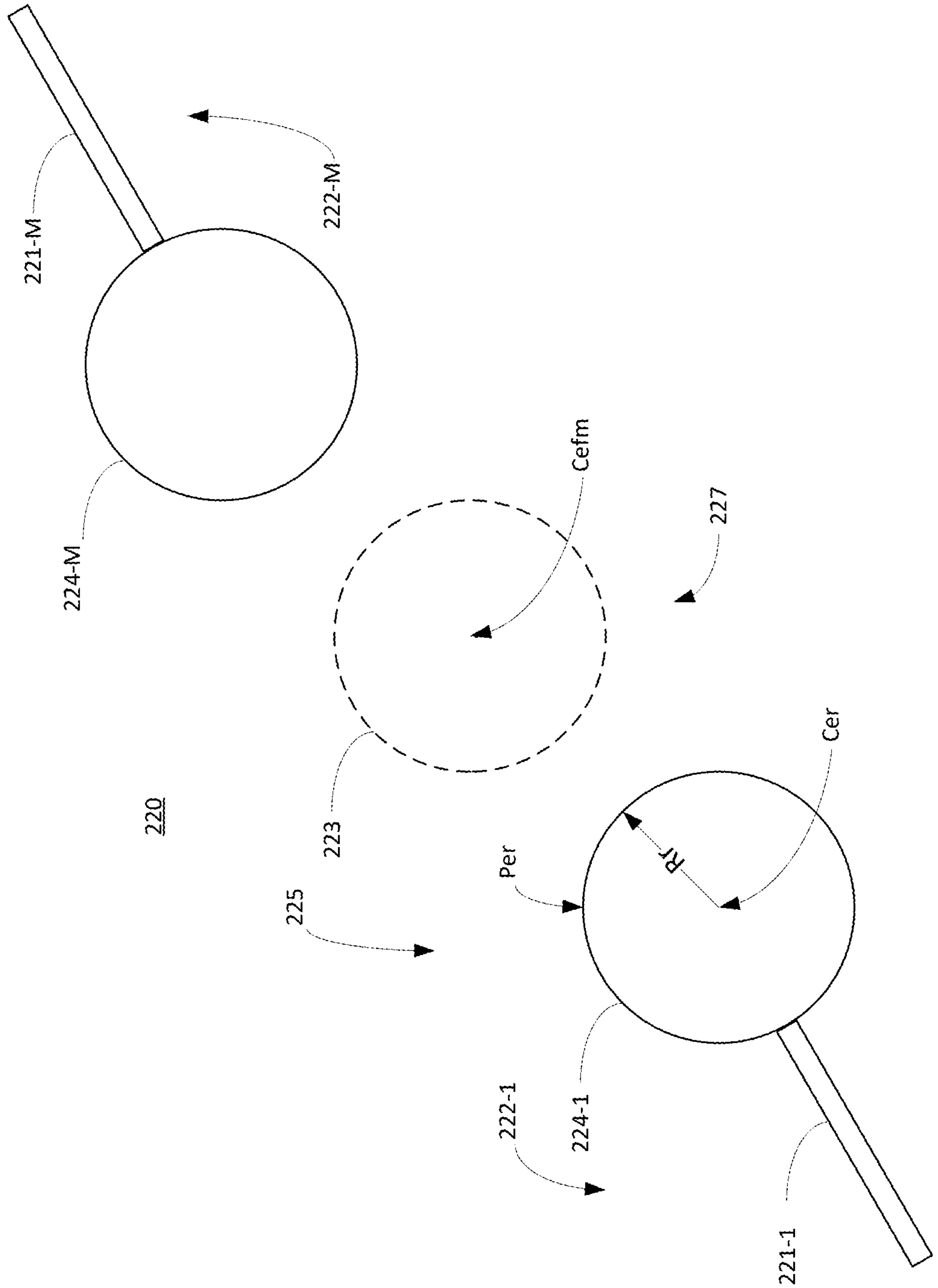
FIG. 2 illustrates a schematic diagram of one embodiment of an electromagnetic feed network configured to provide electromagnetic energy to one or more loop-gap resonators.

FIG. 2 illustrates a schematic diagram of one embodiment of an electromagnetic feed network 220 configured to provide electromagnetic energy to one or more of the N loop-gap resonators. The electromagnetic feed network 220 includes M sets 222-1, 222-M of a shielded transmission line network 221-1, 221-M electrically connected to an electromagnetic coupling element 224-1, 224-M. M is an integer equal to or greater than zero and less than or equal to N; optionally, M equals N.

Each shielded transmission line network 221-1, 221-M is electromagnetically shielded so that it does not emit electromagnetic energy. Each shielded transmission line network 221-1, 221-M may be formed by strip line, a coaxial cable, or any other electromagnetically shielded transmission line.

Each electromagnetic coupling element 224-1, 224-M of one of the M sets 222-1, 222-M is configured to electromagnetically couple electromagnetic energy from a shielded transmission line network 221-1, 221-M to a unique loop-gap resonator. Each electromagnetic coupling element 224-1, 224-M is configured to be positioned adjacent to the first surface FS or the second surface SS of the primary resonator 100 and adjacent to a unique satellite cavity. Each electromagnetic coupling element 224-1, 224-M may be formed by a loop of conductive material, e.g., a wire. Optionally, each coupling element has radius equal to, less than, or greater than, a radius of the satellite cavity over which the coupling element is positioned.

An electromagnetic feed network 220 is configured to be mounted over one of the first surface FS and the second surface of the primary resonator. Optionally, a first electromagnetic feed network is mounted over the first surface FS and a second electromagnetic feed network is mounted over the second surface SS.

Optionally, each electromagnetic feed network 225 has a center point Cefm through which the center axis 118 of the primary resonator 100 is configured to project and where a plane 227 over which the electromagnetic feed network 225 resides is orthogonal to the center axis 118 of the primary resonator 100. For pedagogical purposes, a position of the central cavity 101 is represented by a circle 223 in dashes.

Optionally, each electromagnetic coupling element 224-1, 224-M includes a center point Cer through which a center axis of a unique satellite cavity is configured to project and where the plane 227 is orthogonal to the center axis of the center axis. Optionally, each electromagnetic coupling element includes a perimeter Per defined by electrical conductors of the electromagnetic coupling element which are farthest from the center point Cer of the electromagnetic coupling element. Optionally, the perimeter Per of the electromagnetic coupling element has a radius Rr. Optionally, the perimeter Per of the electromagnetic coupling element is confined within perimeter Ps of the satellite cavity whose center axis projects through the center point Cer of the electromagnetic coupling element.

Figure 3:
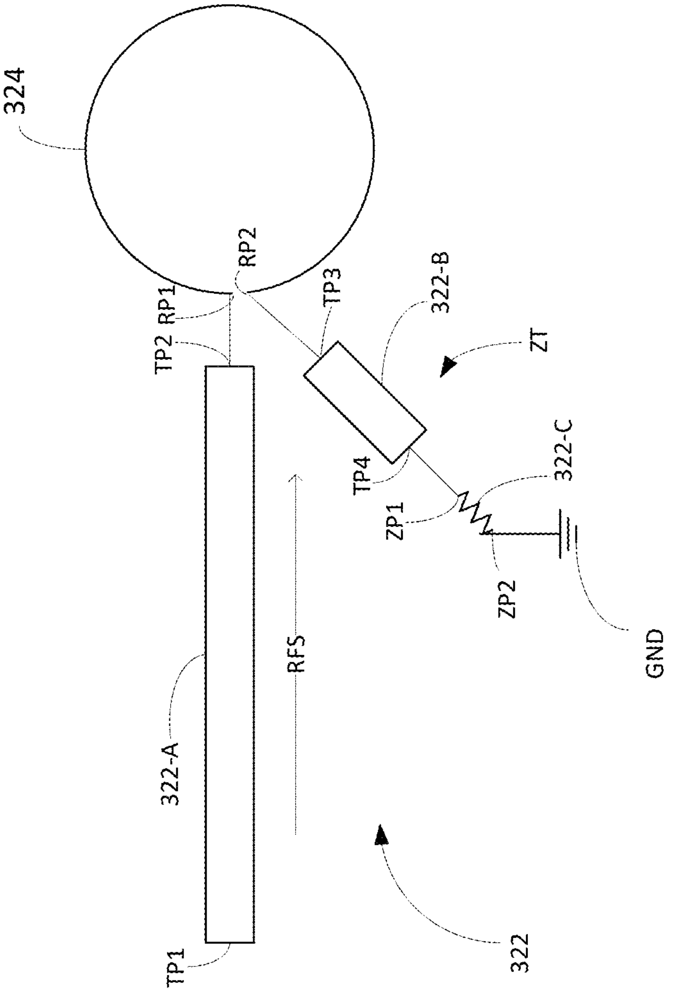
FIG. 3 illustrates a schematic diagram of one embodiment of a set of a shielded transmission line network electrically connected to an electromagnetic coupling element.

FIG. 3 illustrates a schematic diagram of one embodiment of a set of a shielded transmission line network 322 electrically connected to an electromagnetic coupling element 324. The set of the shielded transmission line network 322 includes a first shielded transmission line 322-A, an optional second shielded transmission line 322-B, and an impedance element 322-C.

The first shielded transmission line 322-A comprises a first transmission line port TP1 and a termination impedance ZT. The first shielded transmission line 322-A is configured to receive a radio frequency spectrum[2] electromagnetic signal RFS at a first transmission line port TP1, e.g., from a radio frequency spectrum signal source for example an oscillator. Such radio frequency spectrum electromagnetic signal RFS is configured to propagate to the second transmission line port TP2.

[2] Electromagnetic energy in the radio frequency spectrum is illustrated herein for pedagogical purposes. However, the electromagnetic energy may optionally be in another frequency spectrum.

The electromagnetic coupling element coupling element 324 is configured to couple at least a portion of the radio frequency spectrum electromagnetic signal RFS out of the shielded transmission line network 322. When located adjacent to a satellite cavity, e.g., as discussed elsewhere herein, the electromagnetic coupling element 324 is configured to couple, by electromagnetic near field coupling, the at least a portion of the radio frequency spectrum electromagnetic signal RFS into the loop-gap resonator.

The electromagnetic coupling element 324 includes a first coupling element port RP1 and a second coupling element port RP2. The first coupling element port RP1 is electrically coupled to the second transmission line port TP2. The second coupling element port RP2 is electrically connected to a termination impedance ZT electrically or an electrical ground GND. An impedance value of the termination impedance ZT is selected to enhance, e.g., optimize, an amount of power of the radio frequency spectrum electromagnetic signal RFS radiated from the electromagnetic coupling element 324, and thus coupled into the loop-gap resonator.

For pedagogical purposes, the termination impedance ZT is illustrated as a impedance element 322-C electrically connected to an optional second shielded transmission line 322-B. The impedance element 322-C is electrically connected to ground. The optional second shielded transmission line 322-B is electrically connected to the second coupling element port RP2. However, alternative implementations of the termination impedance ZT may be used.

In the illustrated embodiment of FIG. 3, the termination impedance ZT is implemented as follows. The optional second shielded transmission line 322-B includes a third transmission line port TP3 and a fourth transmission line port TP4. The impedance element 322-C includes a first impedance element port ZP1 and a second impedance element port ZP2. For pedagogical purposes, the impedance element 322-C is illustrated as a resistor; however, the impedance element 322-C may be any type of impedance element. The third transmission line port TP3 is electrically coupled to the second coupling element port RP2. The fourth transmission line port TP4 is electrically coupled to first impedance element port ZP1. The second impedance element port ZP2 is electrically connected to the electrical ground GND.

Figure 4:
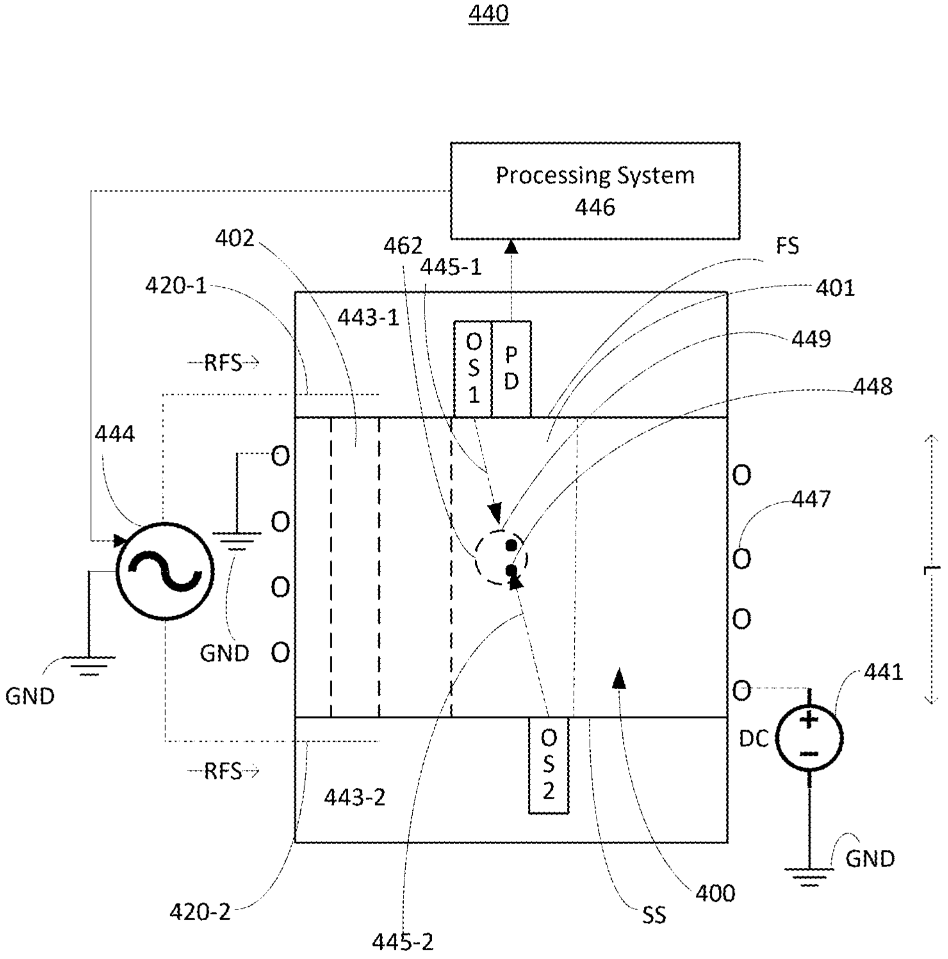
FIG. 4 illustrates a cross sectional diagram of one embodiment of an atomic sensor.

FIG. 4 illustrates a cross sectional diagram of one embodiment of an atomic sensor 440. The atomic sensor may be implemented in different ways. For example, the each pair of optical beams may be generated by a single laser whose light beam passes through the vapor of atoms and is reflected back into the vapor of atoms by an optical reflector, e.g., a mirror. Thus, the optional second light source described below may be replaced by the optical reflector.

The atomic sensor 440 comprises primary resonator 400, a first cap 443-1, a second cap 443-2, an optional at least one electrically conductive coil 447, a first light source OS1, an optional second light source OS2, and at least one photodetector PD. As discussed elsewhere herein, the primary resonator 400 includes a first surface FS, a second surface SS, a central cavity 401, at least one (e.g., two or more) satellite cavities 402, and a cylinder length L.

The first cap 443-1 is configured to be mounted over the first surface FS of the primary resonator 400; thus, the first cap 443-1 encloses a first end (at the first surface FS) of the central cavity 401. The second cap 443-2 is configured to be mounted over the second surface SS for the primary resonator 400; thus, the second cap 443-2 encloses a second end (at the second surface SS) of the central cavity 401.

The illustrated atomic sensor 440 operates by placing an atomic vapor cell 449 including a vapor of atoms 448, e.g., a vapor of alkali atoms[3], in the central cavity 401. The atomic vapor cell 449 may be in a chamber formed by a surface of the central cavity 401, the first surface FF, and the second surface SS. Alternatively, the atomic vapor cell 449 may be formed in other ways, e.g., in an optically clear, insulating container, e.g., made of quartz, inserted in the chamber formed by a surface of the central cavity 401, the first surface FF, and the second surface SS.

[3] For example, rubidium or cesium atoms.

The first and the optional second light sources OS1, OS2 are configured to respectively emit a first coherent optical beam 445-1 and a second coherent optical beam 445-2 directed at the vapor of atoms 448. The first coherent optical beam 445-1 is projected from the first surface FS and the second coherent optical beam 445-2 projected from the second surface. The first coherent optical beam 445-1 and the second coherent optical beam 445-2 are directed towards one another and are configured to meet in a volume 462 in the central cavity 401. Optionally, the first coherent optical source OS1 is mounted in the first cap 443-1, and the optional second light source OS2 is mounted in the second cap 443-2. For this reason and because the frequency of each of the first and the second coherent optical beams 445-1, 445-2 is configured to cool the vapor of atoms 448, the vapor of atoms 448 are trapped (or confined) in the volume 462 in the central cavity 401.

Although FIG. 4 illustrates for pedagogical purposes a pair of optical beams (or, e.g., laser beams or laser light), optionally more than one pair of optical beams, to trap the vapor of atoms 448 in the volume 462. Optionally, each optical source is configured to provide a coherent optical beam. Optionally, each optical source is a laser, a grating utilized to emit light generated by a laser, or another device configured to emit an optical signal or optical beam. Each pair of optical beams includes a beam emitted from opposite sides of the length L of the primary resonator 400, e.g., from the first cap 443-1 and from the second cap 443-2

The optional at least one electrically conductive coil 447 is configured to generate a constant magnetic field in the volume 462 which aligns the spins of the atoms trapped in the volume 462 and diminishes effects of extraneous magnetic fields. The optional at least one electrically conductive coil 447 is configured to be electrically coupled to an optional direct current (DC) voltage source 441. The optional DC voltage source is coupled between the optional at least one electrically conductive coil 447 and electrical ground GND. Optionally, the atomic sensor 440 includes the DC voltage source 441.

An optional radio frequency spectrum signal source 444 generates the radio frequency spectrum electromagnetic signal RFS. The optional radio frequency spectrum signal source 444 is configured to be electrically coupled to at least one electromagnetic feed network 420-1, 420-2, and to provide the radio frequency spectrum electromagnetic signal RFS to each of the at least one electromagnetic feed network 420-1, 420-2. Optionally, the atomic sensor 440 includes the optional radio frequency spectrum signal source 444.

The radio frequency spectrum electromagnetic signal RFS is configured to be provided to at least one end of each satellite cavity 402 in a manner described elsewhere herein. For pedagogical purposes, FIG. 4 illustrates that the radio frequency spectrum electromagnetic signal RFS is provided to both ends of a satellite cavity 402. The radio frequency spectrum electromagnetic signal RFS is configured to be provided to an end of the satellite cavity by a electromagnetic feed network 420-1, 420-2 in a manner described elsewhere herein.

The frequency of the radio frequency spectrum electromagnetic signal RFS causes electrons of the atoms of the vapor of atoms 448 to make transitions between energy levels. Using standard techniques of atomic fluorescence spectroscopy, the atoms may be stimulated to emit light subsequent to making a transition between energy levels, the atomic sensor configured to detect the emitted light by the at least one photodetector PD. In response to receiving the emitted light, the at least one photodetector PD generates an electrical signal. The at least one photodetector PD is configured to be mounted over the central cavity 401 on the first side FS and/or the second side SS. For pedagogical purposes, the at least one photodetector PD is illustrated in FIG. 4 as being mounted over the central cavity 401 on the first side.

An optional processing system (or processing circuitry) 446 is configured to receive the electrical signal. The optional processing system 446 is optionally further configured to process the electrical signal from the at least one photodetector PD so as to correctly infer the presence of variable external influences on the atomic vapor, such as magnetic fields, electrical field, gravitational fields, or inertial forces. Optionally, e.g., when there are no substantially varying external influences on the atomic vapor, and the optional processing system 446 is configured to process the electrical signal from the photodetector PD to generate a control signal CS, to control the frequency of the radio frequency spectrum electromagnetic signal RFS, e.g., generated by the optional radio frequency spectrum signal source 444; so controlled, the optional radio frequency spectrum signal source 444 becomes an atomically stabilized frequency reference.

Figure 5:
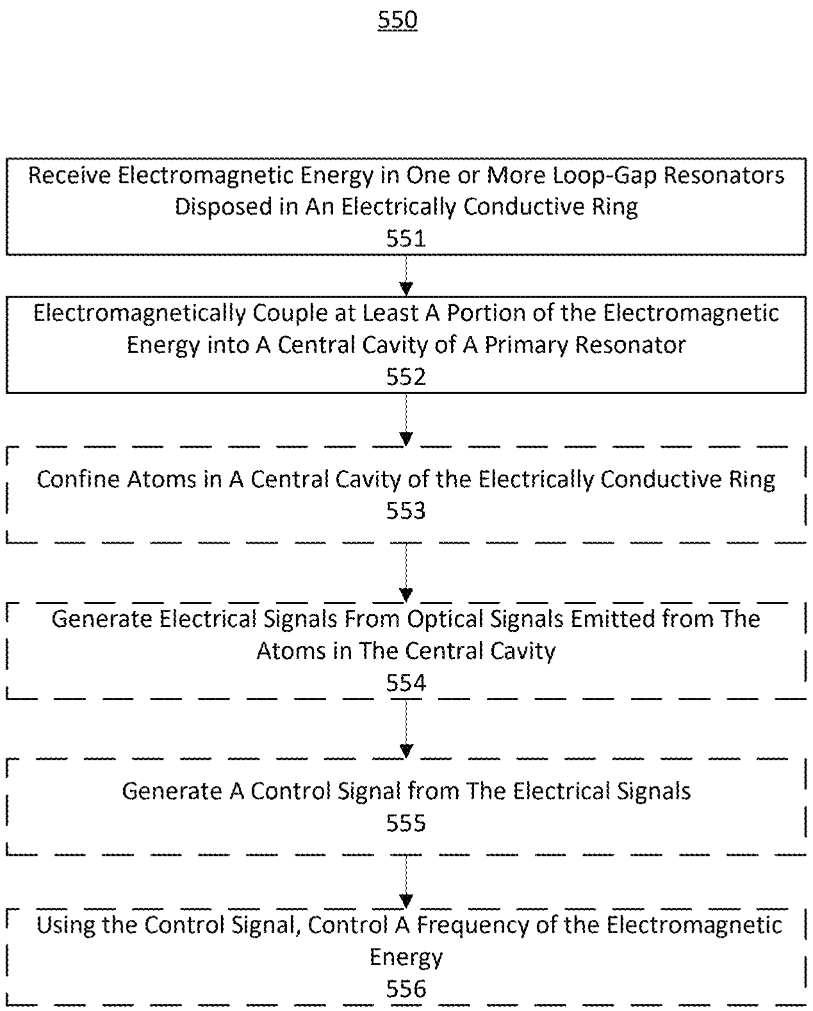
FIG. 5 illustrates a flow diagram of an exemplary method for efficiently coupling electromagnetic energy into a central cavity of a resonator also including one or more loop-gap resonators.

FIG. 5 illustrates a flow diagram of an exemplary method 550 for efficiently coupling electromagnetic energy into a cavity of primary resonator also including one or more loop-gap resonators. Exemplary method 550 may be implemented by one or more of the apparatuses illustrated in FIGS. 1-4. To the extent the methods herein are described herein as being implemented with one or more of the apparatuses illustrated in FIGS. 1-4, it is to be understood that other embodiments can be implemented in other ways. Techniques described with respect to the embodiments illustrated by FIGS. 1-4 may be applicable to the method 550.

The blocks of the flow diagrams herein have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 551, receive radio frequency spectrum electromagnetic energy, e.g., at a first frequency, in one or more loop-gap resonators in an electrically conductive ring. As discussed elsewhere herein, each loop-gap resonator receives the radio frequency spectrum electromagnetic energy from a unique coupling element.

In block 552, at least a portion of the radio frequency spectrum electromagnetic energy is electromagnetically coupled from the one or more loop-gap resonators into a central cavity of a primary resonator. As described elsewhere herein, the primary resonator includes the central cavity and the one or more loop-gap resonators.

In optional block 553, atoms, e.g., alkali atoms, are confined inside the central cavity, e.g., using at least one pair of opposing optical beams, e.g., each generated by a laser, directed into the vapor of atoms in the cavity, for example, as described further elsewhere herein. Further, the atoms in the cavity are subject to at least a part of the portion of the radio frequency spectrum electromagnetic energy.

In optional block 554, optical signals, emitted from the atoms in the central cavity, generate electrical signals, e.g., in a photodetector. The optical signals are emitted by the atoms in the central cavity when subject to the at least a part of the at least a portion of the radio frequency spectrum electromagnetic energy. For purposes of clarity, the at least a part of the at least a portion of the radio frequency spectrum electromagnetic energy is in the central cavity.

In optional block 555, a control signal is generated using the electrical signals, e.g., by a processing system. In optional block 556, a frequency of the radio frequency spectrum electromagnetic energy is controlled, e.g., stabilized, using the control signal.

While the present teachings have been illustrated with respect to one or more implementations, alterations and/or modifications can be made to the illustrated examples without departing from the scope of the appended claims. In addition, while a particular feature of the present disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and/or the claims, such terms are intended to be inclusive in a manner similar to the term "comprising." The term "at least one of" is used to mean one or more of the listed items can be selected. As used herein, the term "one or more of" with respect to a listing of items such as, for example, A and B or A and/or B, means A alone, B alone, or A and B. The term "at least one of" is used to mean one or more of the listed items can be selected.

Terms of relative position as used in this application are defined based on a plane parallel to the conventional plane or working surface of a material (e.g., a layer or a substrate), regardless of orientation. Terms such as "on," "higher," "lower," "over," "top," and "under" are defined with respect to the conventional plane or working surface being on the top surface of a layer or substrate, regardless of orientation. The terms "about" or "substantially" indicate that the value or parameter specified may be somewhat altered, as long as the alteration does not result in nonconformance of the process or structure to the illustrated embodiment. Finally, "exemplary" indicates the description is used as an example, rather than implying that it is an ideal. Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Example Embodiments

Example 1 includes an apparatus for efficiently coupling electromagnetic energy into a central cavity of a primary resonator in an electrically conductive ring, the apparatus comprising: the central cavity in the electrically conductive ring; one or more satellite cavities in the electrically conductive ring; one or more gaps in the electrically conductive ring, wherein each gap commences at a unique satellite cavity and terminates at the central cavity, and wherein each gap, the central cavity, and each satellite cavity are each a void in the electrically conductive ring; one or more loop-gap resonators, wherein each loop-gap resonator comprises the unique satellite cavity and a unique gap between the unique satellite cavity and the central cavity; wherein each loop-gap resonator is configured to receive radio frequency spectrum electromagnetic energy from a source external to the electrically conductive ring; and the primary resonator comprising each loop-gap resonator and the central cavity; wherein each loop-gap resonator is configured to electromagnetically couple at least a portion of the radio frequency spectrum electromagnetic energy into the central cavity.

Example 2 includes the apparatus of Example 1, further comprising one or more coupling elements each of which is configured to electromagnetically couple the radio frequency spectrum electromagnetic energy into each loop-gap resonator, wherein each coupling element is configured to receive the radio frequency spectrum electromagnetic energy from the source; wherein the electrically conductive ring comprises a first surface and a second surface separated by a length of the electrically conductive ring; wherein each coupling element is disposed over the unique satellite cavity and over the first or the second surface.

Example 3 includes the apparatus of Example 2, wherein each coupling element is a loop of electrical conductor whose radius is equal to, less than, or greater than a radius of the unique satellite cavity over which a coupling element is disposed.

Example 4 includes the apparatus of Example 3, wherein each coupling element is centered about a center axis of the unique satellite cavity.

Example 5 includes the apparatus of any of Examples 1-4, wherein each satellite cavity is cylindrical.

Example 6 includes the apparatus of any of Examples 1-5, wherein the central cavity is cylindrical.

Example 7 includes the apparatus of any of Examples 1-6, further comprising: wherein each loop-gap resonator has a first resonance centered around a first resonant frequency; wherein the primary resonator has a second resonance centered around a second resonant frequency; and wherein a difference between the first and the second resonant frequencies is less than or equal to three line widths of a broadest resonance of the first resonance and the second resonance.

Example 8 includes the apparatus of any of Examples 1-7, further comprising: a first cap mounted over a first surface of the electrically conductive ring and enclosing a first end of the central cavity; a second cap mounted over a second surface of the electrically conductive ring and enclosing a second end of the central cavity, wherein the first and the second surfaces are separated by a length of the electrically conductive ring; a vapor of atoms in the central cavity; at least one source of a laser light in each of the first and the second caps; at least one photodetector in at least one of the first and the second caps configured to generate electrical signals in response to optical signals generated by the atoms in response to the at least a portion of the radio frequency spectrum electromagnetic energy in the central cavity; processing circuitry electrically coupled to the at least one photodetector and configured to generate a control signal used to control the frequency of the radio frequency spectrum electromagnetic energy; and one or more coupling elements each of which is configured to electromagnetically couple the radio frequency spectrum electromagnetic energy into a unique loop-gap resonator; wherein each coupling element is disposed over the unique satellite cavity and over the first or the second surface.

Example 9 includes a method for efficiently coupling electromagnetic energy into a central cavity of a primary resonator in an electrically conductive ring, the method comprising: receiving radio frequency spectrum electromagnetic energy in one or more loop-gap resonators, wherein each loop-gap resonator is configured to receive the radio frequency spectrum electromagnetic energy from a source external to the electrically conductive ring, wherein each loop-gap resonator comprises a unique satellite cavity and a unique gap connecting the unique satellite cavity to the central cavity, wherein each gap, each satellite cavity, and the central cavity are in the electrically conductive ring, and wherein each gap, the central cavity, and each satellite cavity are each void in the electrically conductive ring; and electromagnetically coupling from the one or more loop-gap resonators at least a portion of the radio frequency spectrum electromagnetic energy into the central cavity, wherein the primary resonator comprises each loop-gap resonator and the central cavity.

Example 10 includes the method of Example 9, wherein each loop-gap resonator has a first resonance centered around a first resonant frequency; wherein the primary resonator has a second resonance centered around a second resonant frequency; and wherein a difference between the first and the second resonant frequencies is less than or equal to three line widths of a broadest resonance of the first resonance and the second resonance.

Example 11 includes the method of any of Examples 9-10, further comprising: confining atoms in the central cavity using at least one pair of opposing optical; and generating electrical signals from optical signals emitted from the atoms in response to the portion of the radio frequency spectrum electromagnetic energy.

Example 12 includes the method of Example 11, further comprising: generating a control signal from the electrical signals; and using the control signal controlling a frequency of the radio frequency spectrum electromagnetic energy.

Example 13 includes an apparatus configured to efficiently couple electromagnetic energy into a central cavity in an electrically conductive ring, the apparatus comprising: the electrically conductive ring comprising an electrical conductor, the central cavity in the electrical conductor defined by an inner radius, a plurality of gaps in the electrical conductor, and a plurality of satellite cavities in the electrical conductor, wherein each satellite cavity is disposed about the central cavity, is equally spaced with respect to each adjacent satellite cavity, and is equally spaced with respect to the central cavity, wherein each satellite cavity is connected by a unique gap, wherein each satellite cavity has a satellite cavity radius, wherein each gap, the central cavity, and each satellite cavity are each a void in the electrical conductor; at least one loop-gap resonator, wherein each loop-gap resonator comprises a unique satellite cavity and a gap connecting the unique satellite cavity to the central cavity; a primary resonator comprising each loop-gap resonator and the central cavity; and a plurality of a set of at least one shielded transmission line and an electromagnetic coupling element, wherein each shielded transmission line of a set is electromagnetically coupled to a coupling element, wherein each coupling element is configured to electromagnetically couple radio frequency spectrum electromagnetic energy to a unique loop-gap resonator, and wherein each loop-gap resonator is configured to electromagnetically couple at least a portion of the radio frequency spectrum electromagnetic energy into the central cavity.

Example 14 includes the apparatus of Example 13, further comprising: wherein each loop-gap resonator has a first resonance centered around a first resonant frequency; wherein the primary resonator has a second resonance centered around a second resonant frequency; and wherein a difference between the first and the second resonant frequencies is less than or equal to three line widths of a broadest resonance of the first resonance and the second resonance.

Example 15 includes the apparatus of any of Examples 13-14, wherein each coupling element is a loop of electrical conductor whose radius is equal to, less than or greater than the satellite cavity radius of the unique satellite cavity over which the coupling element is disposed.

Example 16 includes the apparatus of any of Examples 13-15, wherein each angle with respect to a center axis of the central cavity and between center axes of each of two adjacent satellite cavities is equal; wherein a distance between the center axis of the central cavity and a center axis of each satellite cavity is equal.

Example 17 includes the apparatus of any of Examples 13-16, further comprising: a first cap mounted over a first surface of the electrically conductive ring and enclosing a first end of the central cavity; a second cap mounted over a second surface of the electrically conductive ring and enclosing a second end of the central cavity, wherein the first and the second surfaces are separated by a length of the electrically conductive ring; a vapor of atoms in the central cavity; at least one source of a laser light in each of the first and the second caps; at least one photodetector in at least one of the first and the second caps configured to generate electrical signals in response to optical signals generated by the atoms in response to the at least a portion of the radio frequency spectrum electromagnetic energy in the central cavity; processing circuitry electrically coupled to the at least one photodetector and configured to generate a control signal used to control the frequency of the radio frequency spectrum electromagnetic energy; and one or more coupling elements each of which is configured to electromagnetically couple the radio frequency spectrum electromagnetic energy into the unique loop-gap resonator; wherein each coupling element is disposed over the unique satellite cavity and over the first or the second surface.

Example 18 includes the apparatus of any of Examples 13-17, wherein each shielded transmission line comprises strip line transmission line.

Example 19 includes the apparatus of any of Examples 13-18, wherein the central cavity is cylindrical.

Example 20 includes the apparatus of any of Examples 13-19, wherein each satellite cavity is cylindrical.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An apparatus for efficiently coupling electromagnetic energy into a central cavity of a primary resonator in an electrically conductive ring, the apparatus comprising:

the central cavity in the electrically conductive ring;

one or more satellite cavities in the electrically conductive ring;

one or more gaps in the electrically conductive ring, wherein each gap commences at a unique satellite cavity and terminates at the central cavity, and wherein each gap, the central cavity, and each satellite cavity are each a void in the electrically conductive ring;

one or more loop-gap resonators, wherein each loop-gap resonator comprises the unique satellite cavity and a unique gap between the unique satellite cavity and the central cavity;

wherein each loop-gap resonator is configured to receive radio frequency spectrum electromagnetic energy from a source external to the electrically conductive ring; and the primary resonator comprising each loop-gap resonator and the central cavity;

wherein each loop-gap resonator is configured to electromagnetically couple at least a portion of the radio frequency spectrum electromagnetic energy into the central cavity;

wherein each loop-gap resonator has a first resonance centered around a first resonant frequency;

wherein the primary resonator has a second resonance centered around a second resonant frequency; and wherein a difference between the first and the second resonant frequencies is less than or equal to three line widths of a broadest resonance of the first resonance and the second resonance.

2. The apparatus of claim 1, further comprising one or more coupling elements each of which is configured to electromagnetically couple the radio frequency spectrum electromagnetic energy into each loop-gap resonator, wherein each coupling element is configured to receive the radio frequency spectrum electromagnetic energy from the source;

wherein the electrically conductive ring comprises a first surface and a second surface separated by a length of the electrically conductive ring;

wherein each coupling element is disposed over the unique satellite cavity and over the first or the second surface.

3. The apparatus of claim 2, wherein each coupling element is a loop of electrical conductor whose radius is equal to, less than, or greater than a radius of the unique satellite cavity over which a coupling element is disposed.

4. The apparatus of claim 3, wherein each coupling element is centered about a center axis of the unique satellite cavity.

5. The apparatus of claim 1, wherein each satellite cavity is cylindrical.

6. The apparatus of claim 1, wherein the central cavity is cylindrical.

7. The apparatus of claim 1, further comprising:

a first cap mounted over a first surface of the electrically conductive ring and enclosing a first end of the central cavity;

a second cap mounted over a second surface of the electrically conductive ring and enclosing a second end of the central cavity, wherein the first and the second surfaces are separated by a length of the electrically conductive ring;

a vapor of atoms in the central cavity;

at least one source of a laser light in each of the first and the second caps;

at least one photodetector in at least one of the first and the second caps configured to generate electrical signals in response to optical signals generated by the atoms in response to the at least a portion of the radio frequency spectrum electromagnetic energy in the central cavity;

processing circuitry electrically coupled to the at least one photodetector and configured to generate a control signal used to control the frequency of the radio frequency spectrum electromagnetic energy; and one or more coupling elements each of which is configured to electromagnetically couple the radio frequency spectrum electromagnetic energy into a unique loop-gap resonator;

wherein each coupling element is disposed over the unique satellite cavity and over the first or the second surface.

8. A method for efficiently coupling electromagnetic energy into a central cavity of a primary resonator in an electrically conductive ring, the method comprising:

receiving radio frequency spectrum electromagnetic energy in one or more loop-gap resonators, wherein each loop-gap resonator is configured to receive the radio frequency spectrum electromagnetic energy from a source external to the electrically conductive ring, wherein each loop-gap resonator comprises a unique satellite cavity and a unique gap connecting the unique satellite cavity to the central cavity, wherein each gap, each satellite cavity, and the central cavity are in the electrically conductive ring, and wherein each gap, the central cavity, and each satellite cavity are each void in the electrically conductive ring; and electromagnetically coupling from the one or more loop-gap resonators at least a portion of the radio frequency spectrum electromagnetic energy into the central cavity, wherein the primary resonator comprises each loop-gap resonator and the central cavity;

wherein each loop-gap resonator has a first resonance centered around a first resonant frequency;

wherein the primary resonator has a second resonance centered around a second resonant frequency; and wherein a difference between the first and the second resonant frequencies is less than or equal to three line widths of a broadest resonance of the first resonance and the second resonance.

9. The method of claim 8, further comprising:

confining atoms in the central cavity using at least one pair of opposing optical; and generating electrical signals from optical signals emitted from the atoms in response to the portion of the radio frequency spectrum electromagnetic energy.

10. The method of claim 9, further comprising:

generating a control signal from the electrical signals; and using the control signal controlling a frequency of the radio frequency spectrum electromagnetic energy.

11. An apparatus configured to efficiently couple electromagnetic energy into a central cavity in an electrically conductive ring, the apparatus comprising:

the electrically conductive ring comprising an electrical conductor, the central cavity in the electrical conductor defined by an inner radius, a plurality of gaps in the electrical conductor, and a plurality of satellite cavities in the electrical conductor, wherein each satellite cavity is disposed about the central cavity, is equally spaced with respect to each adjacent satellite cavity, and is equally spaced with respect to the central cavity, wherein each satellite cavity is connected by a unique gap, wherein each satellite cavity has a satellite cavity radius, wherein each gap, the central cavity, and each satellite cavity are each a void in the electrical conductor;

at least one loop-gap resonator, wherein each loop-gap resonator comprises a unique satellite cavity and a gap connecting the unique satellite cavity to the central cavity;

a primary resonator comprising each loop-gap resonator and the central cavity; and a plurality of a set of at least one shielded transmission line and an electromagnetic coupling element, wherein each shielded transmission line of a set is electromagnetically coupled to a coupling element, wherein each coupling element is configured to electromagnetically couple radio frequency spectrum electromagnetic energy to a unique loop-gap resonator, and wherein each loop-gap resonator is configured to electromagnetically couple at least a portion of the radio frequency spectrum electromagnetic energy into the central cavity;

wherein each loop-gap resonator has a first resonance centered around a first resonant frequency;

wherein the primary resonator has a second resonance centered around a second resonant frequency; and wherein a difference between the first and the second resonant frequencies is less than or equal to three line widths of a broadest resonance of the first resonance and the second resonance.

12. The apparatus of claim 11, wherein each coupling element is a loop of another electrical conductor whose radius is equal to, less than, or greater than the satellite cavity radius of the unique satellite cavity over which the coupling element is disposed.

13. The apparatus of claim 11, wherein each angle with respect to a center axis of the central cavity and between center axes of each of two adjacent satellite cavities is equal;

wherein a distance between the center axis of the central cavity and a center axis of each satellite cavity is equal.

14. The apparatus of claim 11, further comprising:

a first cap mounted over a first surface of the electrically conductive ring and enclosing a first end of the central cavity;

a second cap mounted over a second surface of the electrically conductive ring and enclosing a second end of the central cavity, wherein the first and the second surfaces are separated by a length of the electrically conductive ring;

a vapor of atoms in the central cavity;

at least one source of a laser light in each of the first and the second caps;

at least one photodetector in at least one of the first and the second caps configured to generate electrical signals in response to optical signals generated by the atoms in response to the at least the portion of the radio frequency spectrum electromagnetic energy in the central cavity;

processing circuitry electrically coupled to the at least one photodetector and configured to generate a control signal used to control a frequency of the radio frequency spectrum electromagnetic energy; and one or more coupling elements each of which is configured to electromagnetically couple the radio frequency spectrum electromagnetic energy into the unique loop-gap resonator;

wherein each coupling element is disposed over the unique satellite cavity and over the first or the second surface.

15. The apparatus of claim 11, wherein each shielded transmission line comprises strip line transmission line.

16. The apparatus of claim 11, wherein the central cavity is cylindrical.

17. The apparatus of claim 11, wherein each satellite cavity is cylindrical.

* * * * *